Nov. 19, 1929.　　　T. SCHOU　　　1,736,551
ELECTRIC MOTOR AND GENERATOR
Filed Nov. 5, 1924　　　3 Sheets-Sheet 3

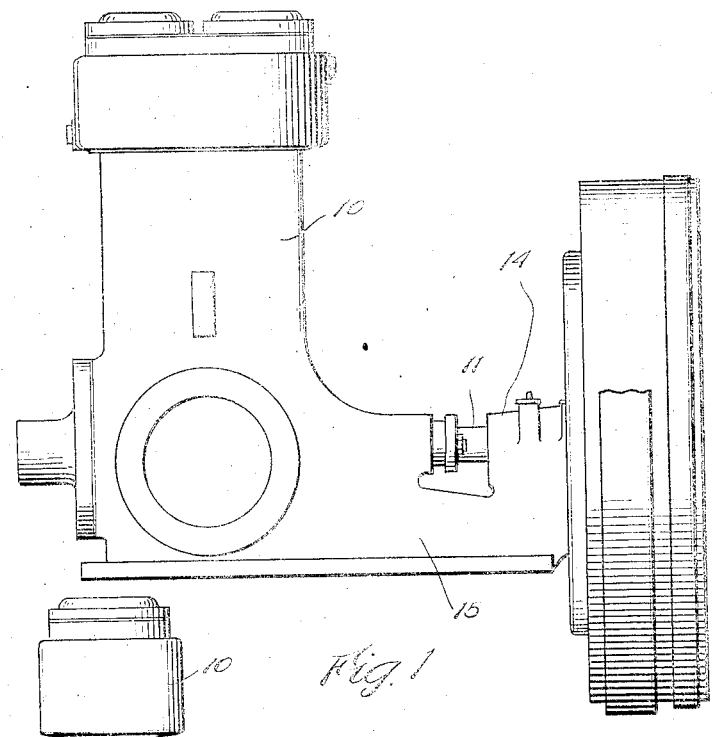
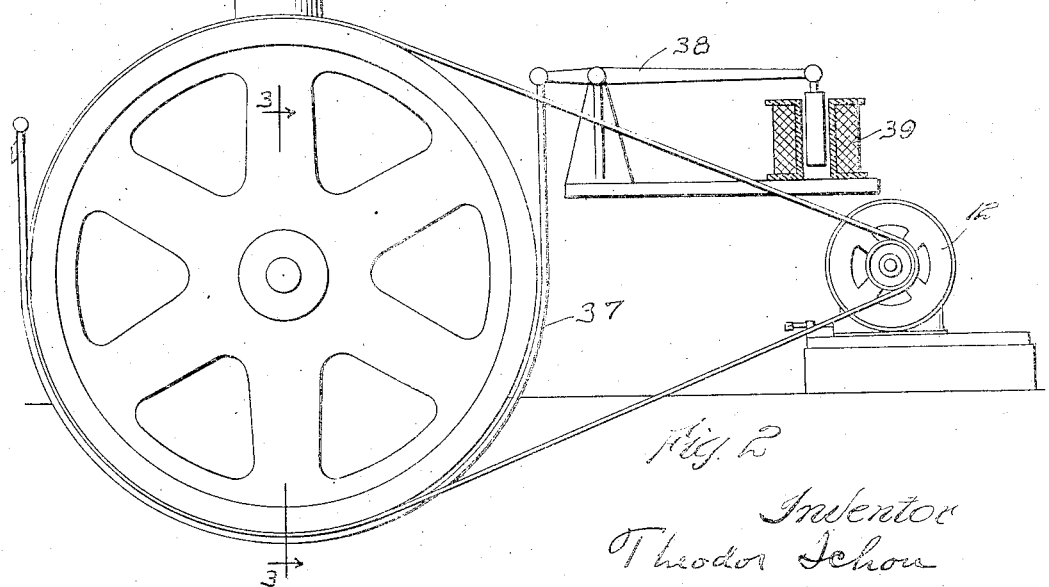

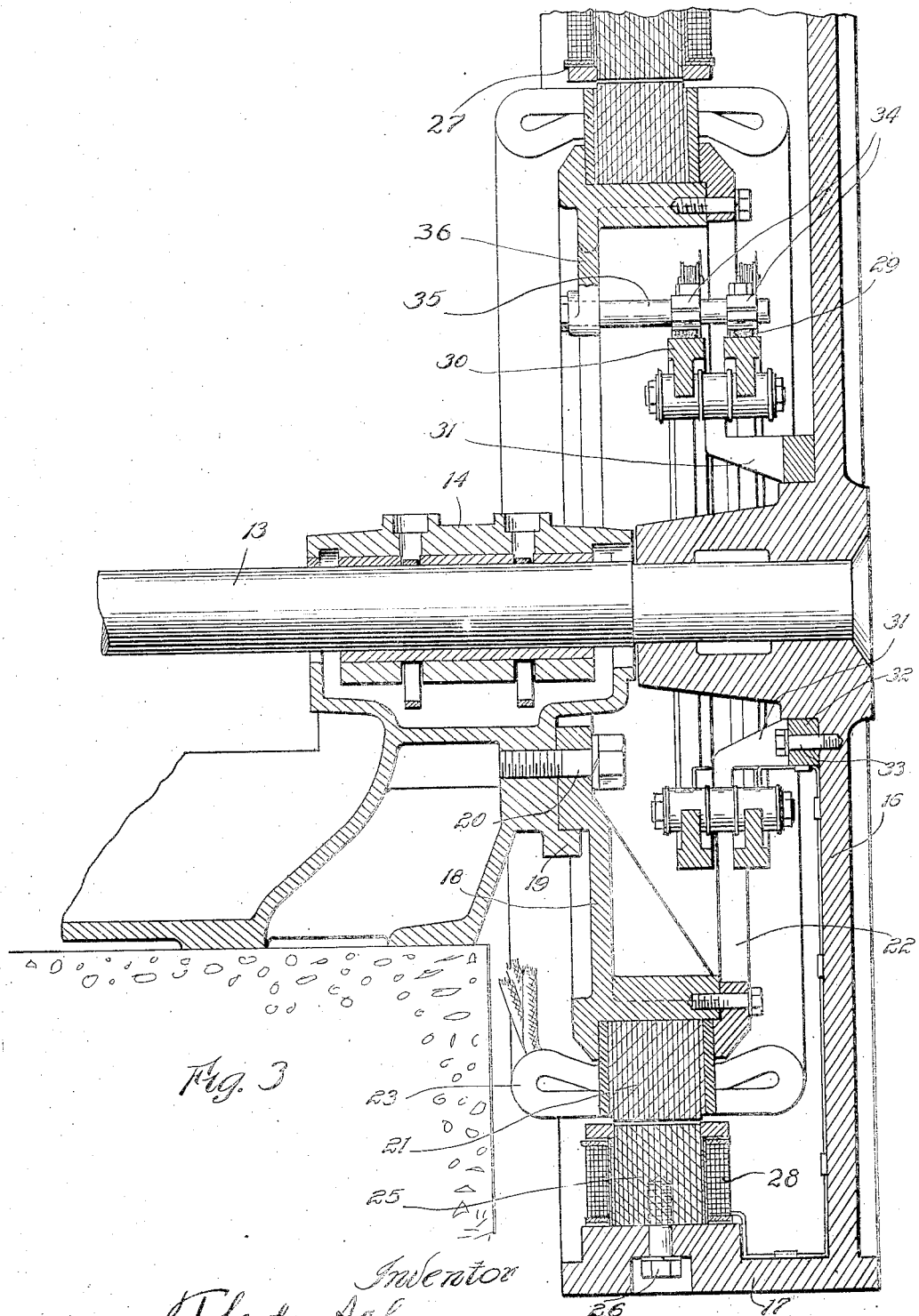

Inventor
Theodor Schou
By Nissen & Crane Attys

Patented Nov. 19, 1929

1,736,551

UNITED STATES PATENT OFFICE

THEODOR SCHOU, OF MANSFIELD, OHIO, ASSIGNOR TO THE IDEAL ELECTRIC & MANUFACTURING CO., OF MANSFIELD, OHIO, A CORPORATION OF OHIO

ELECTRIC MOTOR AND GENERATOR

Application filed November 5, 1924. Serial No. 747,883.

This invention relates to electric motors and generators, and has for one of its objects the provision of devices of the class named in which the rotor shall be in the form of a fly-wheel pulley. Another object is to simplify the construction of such devices so that they may be more economically manufactured, so that they will occupy less space than types of machines heretofore constructed, so that they are adapted for simultaneous connection with a plurality of other devices, and so that they will be of generally improved construction and operation.

The invention is exemplified in the combination and arrangement of parts shown in the accompanying drawings and described in the following specification and it is more particularly pointed out in the appended claims.

In the drawings—

Fig. 1 is an elevation showing one form of the present invention directly connected to apparatus to be driven thereby.

Fig. 2 is a view looking from the right in Fig. 1, showing the fly-wheel motor belted to a dynamo and directly connected to the driven device of Fig. 1.

Fig. 3 is a vertical section substantially on line 3—3 of Fig. 2.

By way of example, the drawings illustrate the invention as installed in a refrigerating plant, the driven apparatus 10 being a well known form of ammonia compressor used in such plants. The invention is illustrated as applied to a synchronous motor directly connected to the ammonia compressor by means of the shaft 11. The motor is also belted to another driven device such as the dynamo 12. The dynamo 12 may be used for generating current for any purpose or it may be merely the exciter for the field coils of the synchronous motor, or the motor may be used to drive any other apparatus desired.

Heretofore it has been the common practice to place the rotor inside of the stator, which necessitates supporting foundation plates or sole plates for the stator and also extra foundation for the same. It is evident that for a given armature bore, the room for the field windings is much more limited or cramped in case of the present day common construction than in case of the fly-wheel type of construction. It is therefore evident that in order to obtain adequate field excitation and also necessary fly-wheel effect for operation of compressors, the rotor diameter would have to be increased very materially and necessitates a large outside stator diameter. In order to provide for necessary fly-wheel effect, auxiliary fly-wheels in most cases have to be resorted to, or the attachment of lateral weights to the rotor which requires very careful balancing and makes the construction expensive to the manufacturer.

Using the fly-wheel type construction with the rotor outside of the stator, the following and other advantages are secured:

1. Elimination of sole plates for the stator.
2. Elimination of necessary foundation for these sole plates.
3. Elimination of setting and grouting in these sole plates in the field and adjusting the air gap, which is rather tedious work.
4. The construction makes it possible and feasible to use standard shaft extension for the various compressors and apparatus.
5. This construction also adapts itself readily to alternators for gas and steam engines and allows for field windings to be wound for low power factor operation with much smaller outside diameter and much less expense than with the ordinary present type of construction.

For the synchronous motor driven compressor, the question of fly-wheel effect is of most importance and it is very desirable to have the necessary fly-wheel effect embodied in the rotor, thus eliminating auxiliary fly-wheels. With the fly-wheel type of construction this feature has been realized because the necessary fly-wheel effect can always be added to the outside rim of the fly-wheel pulley forming a rotating field structure of the motor or alternator.

Figure 4:
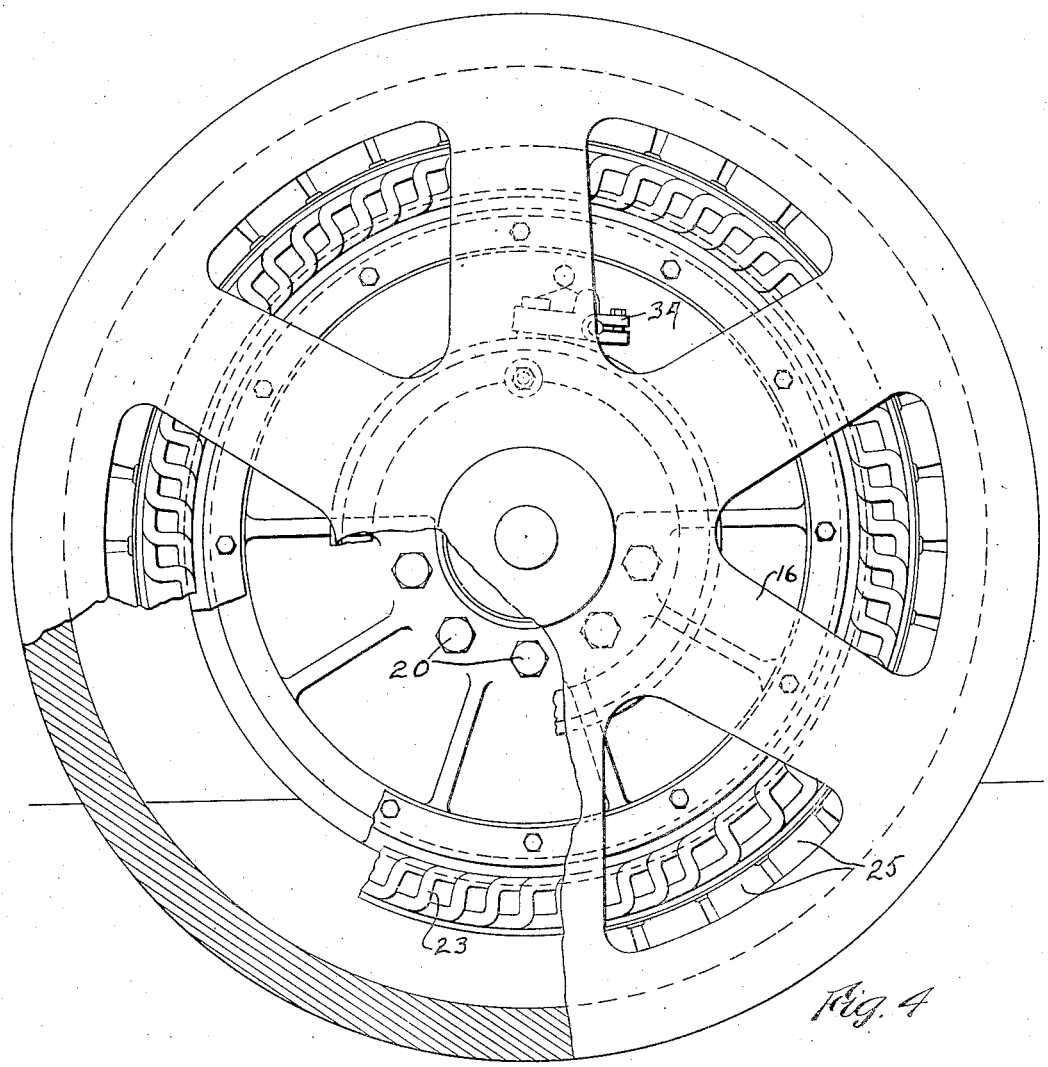
Fig. 4 is an elevation looking from the right in Fig. 3 with parts broken away.
Figure 5:
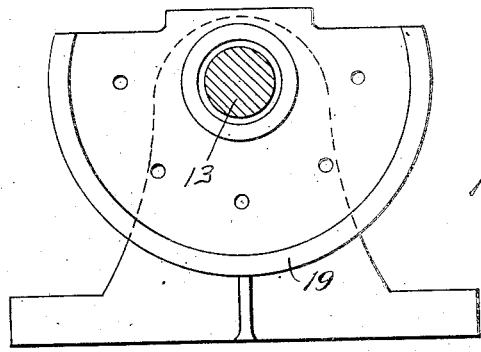
Fig. 5 is an elevation of the supporting yoke or cradle for the stator.

In the present invention the stator is placed on the inside and the rotor is overhung from the main bearing of the driven apparatus and projects back into registration with the stator. By this arrangement the weight of the rotor is carried outwardly away from the center of the shaft so that it is most effective as a fly-wheel and much less weight is therefore required for a given fly-wheel effect. The outer face of the rotor is unobstructed so that any additional weight for fly-wheel purposes may be cast integrally with the outer rim of the rotor, making a very economical and effective construction. The weight of the rotor is kept close to the main bearing so that the stress on the shaft is a minimum and all outboard support is avoided. The parts are all enclosed in the fly-wheel construction and the outer surface of the fly-wheel is left unobstructed so that it is free to be used as the face of a driving pulley. This construction is clearly illustrated in Figs. 3, 4 and 5 of the drawing, in which the numeral 13 designates the main shaft of the compressor 10 supported in the bearing 14 on the compressor base 15. The fly-wheel pulley 16 is attached to the end of the shaft 13 immediately adjacent the outer end of the bearing 14 and the rim 17 of the pulley projects backward so that the weight is all suspended closely adjacent the vertical plane of the bearing 14. In this way the stress on the shaft 13 is reduced to a minimum and the necessity of an additional bearing is avoided. The spider 18 for the stator is suspended from an arcuate cradle or seat 19 formed integrally with the base 15. Cap screws 20 secure the spider 18 to the seat 19. The cradle 19 being formed directly upon the same support as the bearing 14 accurately locates the stator relatively to the rotor to insure a proper air gap spacing between the two as well as proper lateral registration. In prior constructions the stator feet always must be shimmed up or down on the job in order to obtain an equal and proper air gap, and the stator frame must be aligned laterally and bolted down on the sole plate to prevent movement of the frame sidewise. In the present invention the relative position of the rotor and stator parts is completely determined by the cradle 19 independently of the foundation parts and consequently can be accurately fixed at the factory before the machine is sent out. When the machine arrives on the job it is only necessary to erect the parts and they will automatically assume the proper relation to one another without further adjustment.

The stator is provided with laminations 21 secured in place by a detachable plate 22 provided with the usual windings 23 for producing the revolving field of a synchronous machine. Laminated pole pieces 25 are secured to the inner base of the rim 17 by bolts 26 the heads of which are counter-sunk beneath the outer face of the rim 17. Bars 27 may be provided to constitute squirrel cage windings to permit the motor to start as an induction motor. The excitation windings 28 for the pole pieces 25 are supplied with direct current through brushes 29 which bear on slip rings 30 carried by bracket 31 secured to the pulley 16 by screws 33. The brushes 29 are carried by brush holders 34, which are supported on a pin 35 projecting from a bracket arm 36 on the stator spider.

The outer face of this rim 17 in addition to serving as a driving pulley may also be used as a brake sheave. In Figs. 1 and 2 there is shown a brake band 37 arranged to bear upon a portion of the pulley rim and having one end thereof attached to a brake lever 38 actuated by a solenoid 39. It will be understood, of course, that other forms of brakes may be used.

It will be apparent that many applications of the invention may be made other than that illustrated in the drawing, and that the invention may be used as a dynamo as well as a motor. The arrangement especially adapts itself to direct connection to a prime mover in the same manner in which the motor is shown as connected with a compressor. Many applications within the spirit and scope of the invention will readily suggest themselves to those skilled in the art, and I therefore do not wish to limit the invention to the particular construction shown and described except as defined in the appended claims.

I claim:

1. In an electrical machine, a base, a shaft journaled in said base, a pulley secured to said shaft and having a rim disposed outwardly from said shaft, electrical windings mounted on the inner face of said rim, a bracket carried on said base adjacent said bearing and forming an upwardly opening concave seat, and a stator having external windings, said stator having a convex face resting in said seat for supporting said stator and positioning the windings thereof in proper registration with the windings of said rotor.

2. In an electrical machine, a base, a shaft journaled in said base, a supporting cradle mounted on said base and having a curved seat concave on its upper face, a stator having a curved bearing portion detachably mounted in said seat, and a rotor secured to said shaft and having windings thereon disposed outside of said stator, said stator and rotor being positioned and held in proper registration and spaced relative to one another by said cradle.

3. In electrical machinery, an alternator comprising a base, a shaft journaled in said base, a bracket on said base having an arcuate concave seat concentric with said shaft, an internal stator supported on said seat, an external rotor mounted on said shaft, windings on said stator for producing a rotary field, and excitation windings on said rotor in registration in the direction of the axis of said shaft with the windings on said stator.

4. In electrical machinery, a base, a shaft journaled in said base, a pulley secured to said shaft and having a rim disposed outwardly from said shaft, electrical windings mounted on the inner face of said rim, a bracket carried on said base adjacent said bearing and having an arcuate concave seat extending through an arc of more than half a circle, and a stator supported in said seat and having a convex bearing base fitting in said seat.

In testimony whereof I have signed my name to this specification on this 31st day of October, A. D. 1924.

THEODOR SCHOU.